United States Patent [19]

Uram, Jr.

[11] Patent Number: 4,555,450

[45] Date of Patent: Nov. 26, 1985

[54] MOISTURE-RESISTANT TRANSPARENT MERCAPTAN COMPOSITIONS

[75] Inventor: John R. Uram, Jr., Glendale, Ariz.

[73] Assignee: Goodyear Aerospace Corporation, Akron, Ohio

[21] Appl. No.: 605,725

[22] Filed: May 1, 1984

Related U.S. Application Data

[60] Continuation-in-part of Ser. No. 394,204, Jul. 1, 1982, Pat. No. 4,454,201, and a continuation-in-part of Ser. No. 394,205, Jul. 1, 1982, Pat. No. 4,450,202, each is a division of Ser. No. 232,054, Feb. 5, 1981, Pat. No. 4,343,928, which is a continuation-in-part of Ser. No. 204,424, Nov. 6, 1980, Pat. No. 4,352,848, which is a continuation-in-part of Ser. No. 70,390, Aug. 28, 1979, Pat. No. 4,294,886.

[51] Int. Cl.$^4$ .................... C08G 59/66; C08G 59/56
[52] U.S. Cl. .................................. 428/412; 428/413; 428/414; 428/415; 525/505; 528/92; 528/109; 528/111

[58] Field of Search ................ 528/92, 109, 111; 525/505; 428/412, 413, 414, 415

[56] References Cited

U.S. PATENT DOCUMENTS 3,776,978  12/1973  Markovitz .................. 528/92 X
4,085,250   4/1978  Smith ......................... 528/92 X
4,117,361   9/1978  Smith et al. ................ 528/92 X
4,365,052  12/1982  Reeh et al. ................... 528/92

OTHER PUBLICATIONS

Kirk–Othmer, *Encyclopedia of Chemical Technology*, vol. 1, pp. 213–219, 2nd Ed., 1963, Wiley, N.Y.

*Primary Examiner*—Earl Nielsen
*Attorney, Agent, or Firm*—P. E. Milliken; D. J. Hudak; L. A. Germain

[57] ABSTRACT

A transparent moisture-resistant mercaptan composition is made utilizing an amino-titanate catalyst. The composition can be utilized in association with high heat-resistant transparent compositions containing a boroxine compound.

19 Claims, 16 Drawing Figures

Days of Exposure at 200°F /100% Relative Humidity

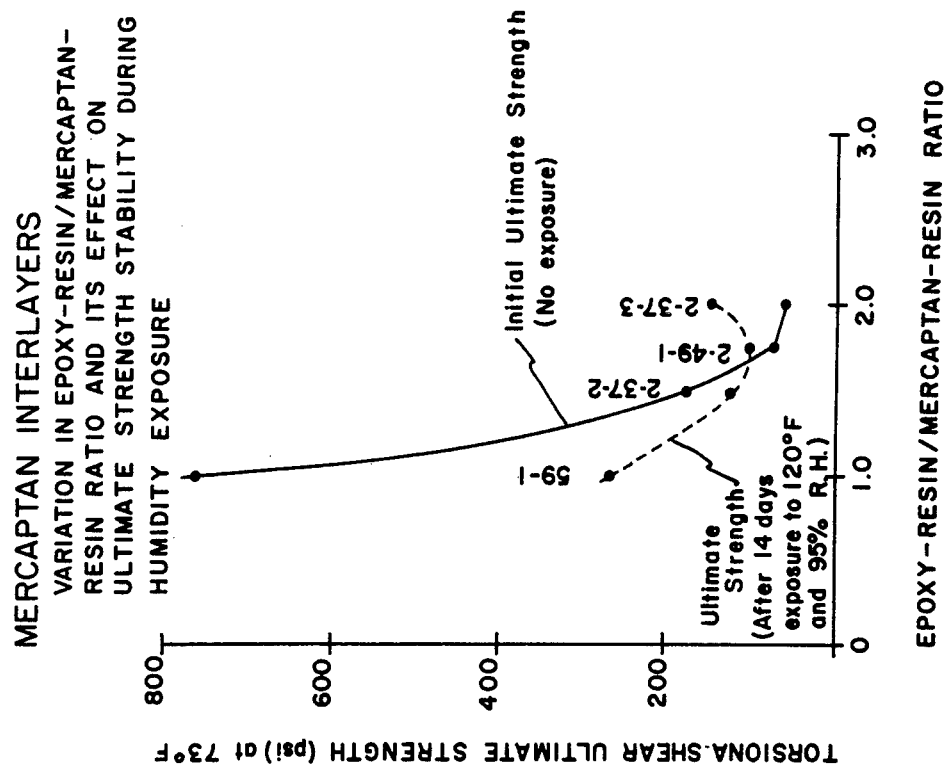
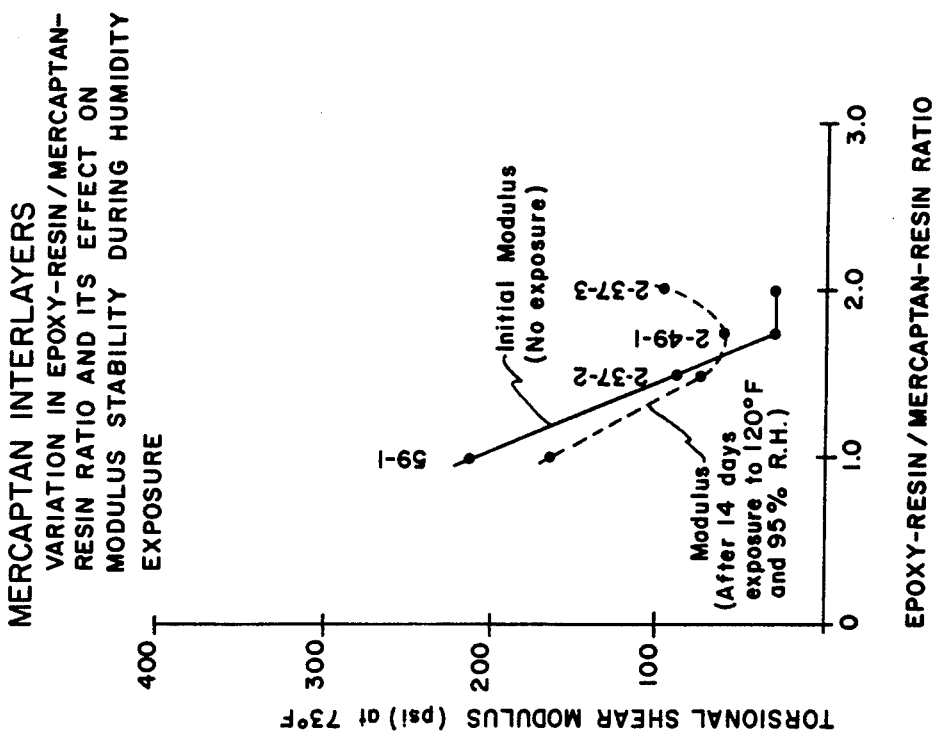

MOISTURE-RESISTANT TRANSPARENT MERCAPTAN COMPOSITIONS

CROSS-REFERENCE

This application is a continuation-in-part of U.S. Ser. Nos. 394,204, now U.S. Pat. No. 4,454,201, and Ser. No. 394,205, now U.S. Pat. No. 4,450,202, both filed July 1, 1982. Application Ser. Nos. 394,204 and 394,205 are divisions of Ser. No. 232,054, filed Feb. 5, 1981, now U.S. Pat. No. 4,343,928. Application Ser. No. 232,054 is a continuation-in-part of Ser. No. 204,424, filed Nov. 6, 1980, now U.S. Pat. No. 4,352,848, which in turn is a continuation-in-part of U.S. Ser. No. 70,390, filed Aug. 28, 1979, now U.S. Pat. No. 4,294,886.

TECHNICAL FIELD

The present invention relates to moisture-resistant blends or compositions containing amino-titanate catalysts. The invention further relates to the utilization of such compositions in association with high heat-resistant transparent compositions containing a boroxine compound, for example as in the form of a high heat-resistant transparent laminate.

BACKGROUND ART

Heretofore, the use of transparencies in military and industrial hardware has required exacting properties for their certified use. For example, a military helicopter having vast areas of transparent material will require special transparent material having identifiable indices of refraction to prevent internal reflection of sunlight. Other transparencies require resistance to penetration by projectiles. Still other transparencies are designed for resistance to abrasion.

The use of these transparencies in military and industrial applications have been severely limited by the temperatures these composite materials could withstand. Direct application of a heat source or a high energy point of origin could quickly alter the physical properties of the composite materials. Whether the thermal effects be generated by fossil fuel fires or laser application, the conventional transparencies lacked sufficient resistance to the intense heat generated. Therefore, the need exists for a material which is heat resistant, in order to complement the impact, ballistic, abrasion, or light-resistant materials presently existing in composite transparencies.

Likewise, the use of these transparencies in military and industrial application has been subjected to irreversible damage caused by the penetration of moisture into the various layers of the composite transparent structure. The susceptibility of these materials to moisture penetration in humid conditions creates a lasting haze within the transparency structure. Further, the materials must maintain adhesion among the various layers and also must maintain modulus values among the various layers at acceptable and constant levels. Therefore, the need exists for a material which is resistant to moisture permeability to protect conventional and heat-resistant transparent materials from haze characteristics but further maintains ultimate strength and constant modulus.

Although mercaptan resins, as set forth in various parent applications have fulfilled the above need, both as a composition and as an interlayer, they have some drawbacks. For example, not all mercaptan resins were soluble and suitable solvents thus requiring stronger solvents which could craze various plastic substrate surfaces. Moreover, various physical properties such as adhesion strength, elongation, modulus, and ultimate strength were only adequate.

In the parent applications, generally the following prior art patents have been cited: U.S. Pat. No. 3,134,754 to Brunner; U.S. Pat. No. 3,378,504 to Lee; U.S. Pat. No. 3,247,280 to Kanner; Japanese Pat. No. 7,243,200; German Pat. No. 1,745,149; U.S. Pat. No. 2,953,545 to Finestone; U.S. Pat. No. 3,269,853 to English; U.S. Pat. No. 3,637,591 to Coran; U.S. Patent Nos. 4,294,886 to Uram; 3,300,369 to Burkley; 3,928,708 to Fohlan et al, 3,616,839 to Burrin, 4,230,769 to Goossens; 4,081,581 to Littell; 4,343,854 to Moorman; and Japanese Pat. No. 0043,200.

However, none of these patents teach or suggest the utilization of an amino-titanate catalyst with a mercaptan resin or that good physical properties such as ultimate strength, adhesion, modulus, good moisture resistance, and the like are obtained.

DISCLOSURE OF INVENTION

It is therefore an aspect of the present invention to provide a moisture-resistant transparent composition having a mercaptan resin therein.

It is a further aspect of the present invention to provide a moisture-resistant transparent composition, as above, which is resistant to moisture permeability and has good ultimate strength.

It is another aspect of the present invention to provide a moisture-resistant transparent composition, as above, which has little or no haze therein.

It is another aspect of the present invention to provide a moisture-resistant transparent composition, as above, having an amine-titanate catalyst therein.

It is yet another aspect of the present invention to provide a moisture-resistant transparent composition, as above, wherein said composition is an interlayer binding a transparent material, for example, a plastic or a high heat-resistant material thereto.

It is yet another aspect of the present invention to provide a moisture-resistant transparent composition, as above, wherein said high heat-resistant material can be incorporated with composite transparencies for use in military and industrial applications.

It is yet another aspect of the present invention to provide a moisture-resistant transparent composition, as above, wherein said moisture-resistant interlayer protects various transparent materials from the effects of moisture, haze, and the like.

It is yet another aspect of the present invention to provide a moisture-resistant transparent composition, as above, wherein said high heat-resistant composition is a boroxine compound therein.

These and other objects of the present invention will become apparent from a detailed description of the invention.

In general, a composition resistant to moisture permeation, comprising:

a blend having, about 100 parts by weight of a mercaptan resin, from about 20 parts to about 300 parts by weight of an epoxy resin, and from about 0.1 to about 4.0 parts by weight of an amino-titanate compound.

DESCRIPTION OF THE DRAWINGS

For an understanding of the invention, reference is had to the following drawings, wherein:

FIG. 13 is a graph showing the variation in concentrations of the composition of the present invention and its effect on modulus stability during humidity exposure;

FIG. 14 is a graph showing the variation in concentrations of the composition of the present invention and its effect on ultimate strength stability during humidity exposure;

FIG. 16 is a graph showing the relationship between the concentration of the phosphate compound and the ability of the heat-resistant interlayer to resist flame penetration.

DETAILED DESCRIPTION OF THE INVENTION

Transparencies that have been produced with epoxy resins desiring to achieve heat-resistant properties have typically included a boroxine such as trimethoxyboroxine. Typical epoxy resins include, but are not limited to, bisphenol-A type, bisphenol-F type, and novolac type epoxy resins. Typical boroxines include boroxines having the formula

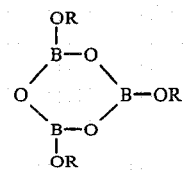

where R is a compound having from 1 or 2 to 18 carbon atoms. Desirably, R is an alkyl compound and has from 1 or 2 to 5 carbon atoms. Trimethoxyboroxine is preferred. Trimethoxyboroxine has exhibited, in combination with epoxy resin, a resistance to heat from a general or point source up to temperatures of 2000° F. However, a major complication is the low concentration of trimethoxyboroxine in the epoxy resin system. Previously, for large casting purposes, it was possible to use a concentration of trimethoxyboroxine of 5-7.5 parts per hundred parts of epoxy resin (PHR). Any greater concentration would deleteriously promote the reaction between the trimethoxyboroxine and the epoxy resin, resulting in a short gel time making it extremely impractical to cast large panels.

Figure 4:
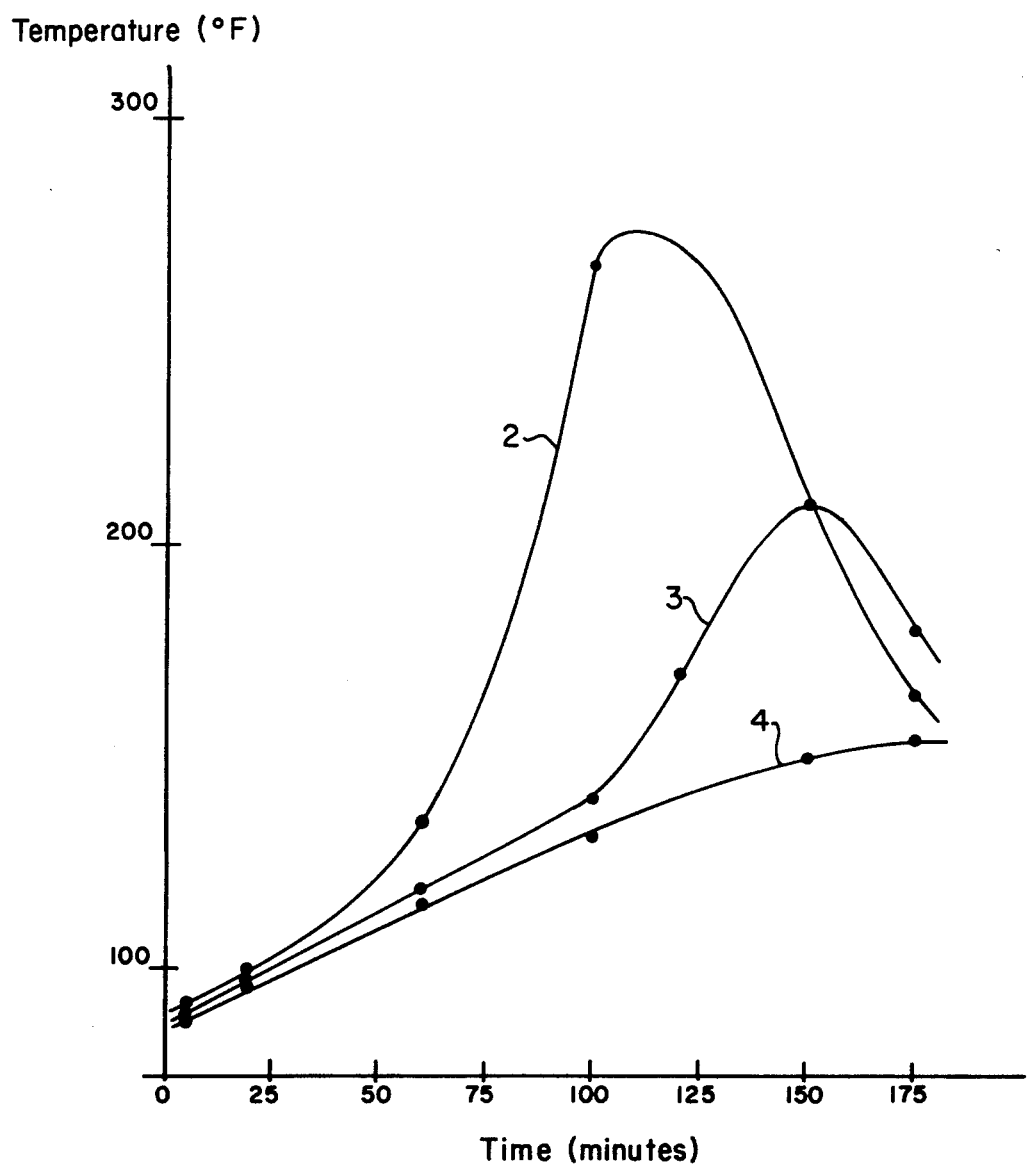
FIG. 4 is a graph showing the effect of alcohol levels on the maximum exotherm in the reaction system.

It has been previously found that higher concentrations of a boroxine such as trimethoxyboroxine can be incorporated into an epoxy resin system and still have sufficient time to cast large sheets if a phenyl substituted alkyl alcohol is added. The alkyl alcohol contains from 1 to 20 carbon atoms and desirably from 1 to 10 carbon atoms. Preferably, benzyl alcohol is used. The alcohol acts as retarder and inhibitor for the trimethoxyboroxine epoxy reaction, permitting the usage of an increased concentration of the trimethoxyboroxine and a concommitant increase in heat-resistant properties. This concentration may be readily increased to 30 parts of a boroxine such as trimethoxyboroxine per hundred parts of epoxy resin. Not only is the rate or reaction between the trimethoxy boroxine and epoxy resins inhibited, but the maximum exotherm is significantly reduced with the phenyl substituted alkyl alcohol addition, as shown in FIG. 4.

TABLE I

THE EFFECT OF BENZIL ALCOHOL ON MAXIMUM EXOTHERM

| | Curve | | |
|---|---|---|---|
| | 2 | 3 | 4 |
| Trimethoxyboroxine | 10 | 10 | 10 |
| Benzyl alcohol | 2 | 3 | 4 |
| Dow DEN-431 | 85 | 85 | 85 |
| Neopentyl Glycol Diglycidyl ether | 15 | 15 | 15 |
| Gel time (minutes) | 65 | 85 | No sharp gel time |
| Maximum Exotherm (°F.) | 270 | 21 | 115 |

While phenyl substituted alkyl alcohols permit increased concentration of the trimethoxyboroxine in the epoxy resin, benzyl alcohol is preferred. Benzyl alcohol is preferred because of its purity, as well as its index of refraction, its clear color, its high flash point, its relatively low solubility in water, its low viscosity, and its high boiling point.

Both the epoxy resins capable of serving as the matrix for the intense heat-resistant composite and the trimethoxyboroxine and their heat-resistant properties are known to those skilled in the art of composite transparency production. However, it is the inclusion of the phenyl substituted alkyl alcohol which enables one to increase the level of trimethoxyboroxine which results in an increase in intense heat resistance for the transparency not otherwise present. The phenyl substituted alkyl alcohol is present in a concentration of from about 20 parts to about 50 parts per one hundred parts of trimethoxyboroxine or from about 1 part to about 10 parts per 100 parts of epoxy resin. Preferably, the concentration of benzyl alcohol is 33 parts to 100 parts of trimethoxyboroxine, or 3.3 parts to 100 parts of epoxy resin.

Figure 1:
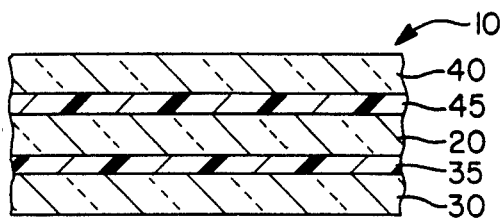
FIG. 1 is a cross-sectional view of the transparency composite having the intense heat-resistant interlayer.

Referring now to FIG. 1, it may be seen that the transparency composite, generally referred to as 10, is composed of three layers with the epoxy resin interply 20, a reaction product of an adduct of trimethoxyboroxine and benzyl alcohol with an epoxy resin placed between an inside ply 40 and an outside ply 30. The outside ply 30 may be composed of transparent materials well known to those skilled in the art and specifically providing impact, ballistic, abrasion, weather-resistant and light reflectant-resistant properties which resin interply 20 complements.

Typically, this outside ply 30 may be composed of acrylic, polycarbonate, polyurethane and any inside ply 40 may be chosen from those same transparent materials or others well known to those skilled in the art which are not necessary for impact, ballistic, abrasion, weather resistance or light reflection resistance.

Figure 3:
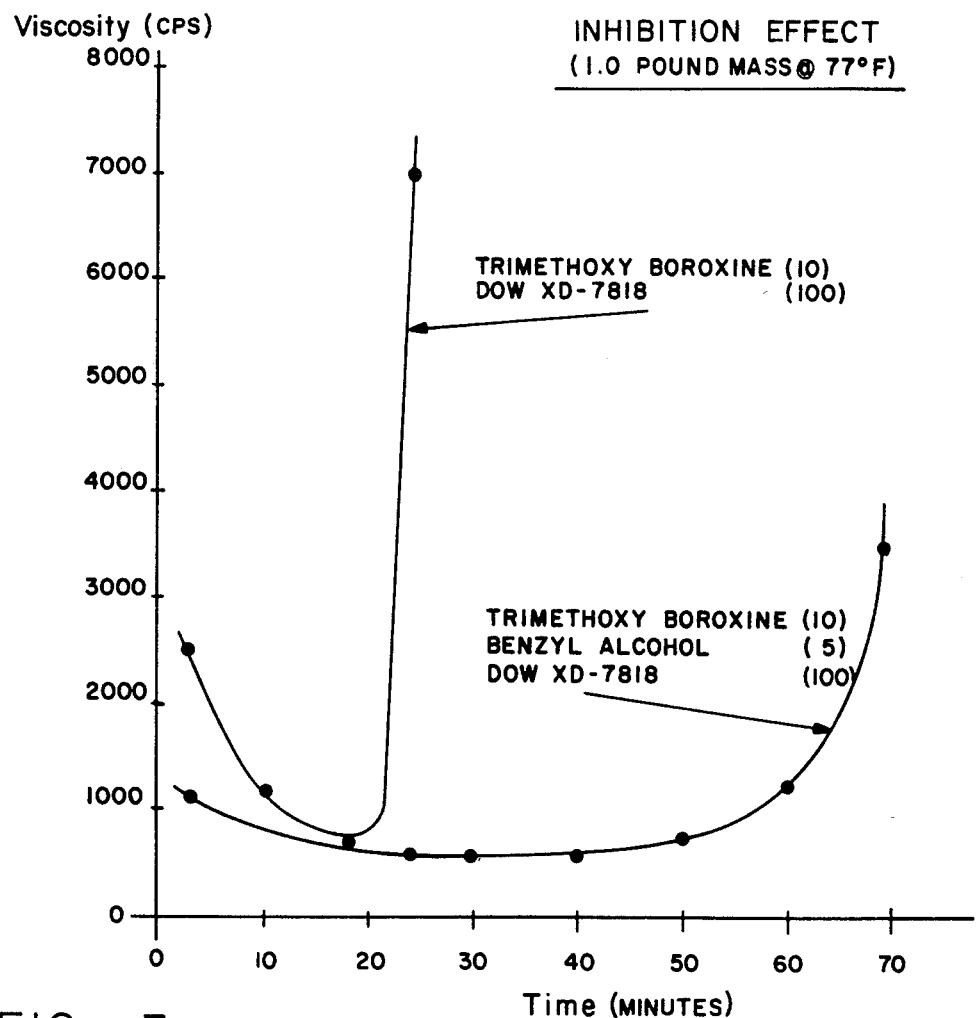
FIG. 3 is a graph of the production of the transparency having benzyl alcohol showing the increase in gel time.

All of the components of interply 20 are mixed and degassed, then cast against an acrylic ply through the use of a casting cell technique well known to individuals in the industry. Should it be necessary to cast interply 20 by itself, the same technique can be used, the only difference being interply 20 would be cast against chemically treated glass plies, such that after cure the glass plies can be removed, resulting in an optically clear interply 20. This interply casting can then be bonded to other transparent layers with materials as discussed below. However, the use of the alcohol permits larger castings than previously possible. Gel times are increased by the addition of the alcohol to permit larger castings, as may be seen in FIG. 3.

When joining the various plies 20, 30 and 40 of the transparency composite 10, it may be necessary to use binding means to ensure adequate contiguity between the various layers. For example, binding means 45 may exist between the intense heat-resistant resin interply 20 and inside ply 40, and this binding means 45 may be chosen from adhesives such as silicones, urethanes and epoxies. Also bonding means 35 may be necessary between intense heat-resistant resin interply 20 and outside ply 30, the composition of such binding means being typically silicones, urethanes, and epoxies.

However, it is preferred to utilize a mercaptan resin for binding means 35 and 45, as described below, to increase resistance to moisture permeability for transparency composite 10.

The intense heat-resistant resin interply 20 may optionally be composed of an epoxy resin cured with adducts of a boroxine such as trimethoxyboroxine, phenyl subtituted alkyl alcohols, and organic phosphorus compounds selected from the following formula

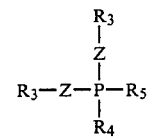

where $R_3$ is selected from the group consisting of hydrocarbon radicals having from 1 to 24 carbon atoms, halo-substituted organic radicals having from 1 to 24 carbon atoms, and multihalo-substituted organic radicals having from 1 to 24 carbon atoms; and wherein $R_3$ may be the same or different radicals.

The $R_4$ is selected from the group consisting of all the radicals of $R_3$, oxygen, and radicals of the formula: —O—$R_6$, where $R_6$ is selected from the group consisting of all the radicals of $R_3$, organo-phosphorus polymeric radicals, and organo-phosphorus esters; where $R_5$ is selected from the group consisting of hydrogen, hydroxyl, oxygen, sulfur, halogens or no radical at all; and where Z is selected from the group consisting of oxygen, sulfur or no radical at all. Examples of $R_3$ are phenyl, alkyl-substituted phenyl, chloro-substituted alkyl, and alkyl radicals. Examples of $R_4$ radicals are the examples of $R_3$ radicals, oxygen, phenoxy, alkyl-substituted phenoxy, alkoxy, alkyl-substituted alkoxy, chloro-substituted phenoxy, chloro-substituted alkoxy radicals and radicals having phosphorus units in polymeric or ester configuration.

Specific compounds include triphenyl phosphite, diphenyl phosphite, diphenyl isodecyl phosphite, trisnonylphenyl phosphite, tri(beta, beta'dichloroisopropyl)phosphate, tri(beta chloroethyl)phosphate, bis-chloroethyl phosphate ester, and a phosphate polymer of the formula:

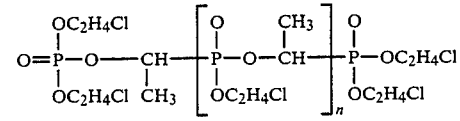

where n is a number from 1 to 20.

The desirable phosphite compounds are: diphenyl phosphite, trisnonylphenyl phosphite, triphenyl phosphite, and diphenylisodecyl phosphite, diphenyl-isooctyl phosphite and phenyldiisodecyl phosphite. Preferably, diphenyl phosphite and triphenyl phosphite may be used. The addition of from 20 parts to 400 parts of an organic phosphorus compound such as per 100 parts of the boroxine dramatically increases the intense heat-resistant properties of the interply 20 at high temperatures, typically greater than 2000° F. Alternately, the concentration of the organic phosphorus compound may be from about 50 parts to 250 parts per 100 parts of the boroxine or from about 5 parts to about 40 parts per 100 parts of the epoxy resin. The addition of this amount of triphenyl phosphite provides sufficient phosphorus in the resin to increase the time of burn-through of a ¼ inch casting of interply 20 almost ten times as long as interply 20 without phosphorus is further beneficial by providing a greater than 20 percent increase in time of burning at the lower temperatures around 2000° F. Therefore, the inclusion of this phosphite significantly increases the intense heat-resistant properties already present in the interlayer 20 and complements the other resistant properties in outer layer 30 in the transparency composite 10.

Of the phosphate compounds, the specific phosphate compounds already mentioned are desirable. Preferably, tri(beta, beta' dichloroisopropyl)phosphate and tri(beta chloroethyl) phosphate may be used. The former is commercially available under the trade name Fyrol FR-2 manufactured by Stauffer Chemical Company, whereas the latter compound is commercially available as Fyrol CEF, manufactured by Stauffer Chemical Company. The addition of from about 10 parts to about 400 parts of the phosphate compound per ings. Further, the phosphate compound does not shorten gel times because the chemical interaction of the phosphate during curing does not produce by-products which act as accelerators for the reaction. As the optimum phosphate compound concentration is obtained, it may be possible to eliminate the phenol substituted alkyl alcohol as an inhibitor of gel time, such as that seen in FIG. 3. The following Table II demonstrates the formulation of an interply 20 employing phosphate compounds. However, it may be possible to employ a combination of phosphite and phosphate compounds for improved burn-through efficiency.

TABLE II

FORMULATIONS OF INTERPLY 20 USING PHOSPHITE AND PHOSPHATE COMPOUNDS, RESPECTIVELY/IMPROVEMENT IN HEAT RESISTANCE

|  | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Boroxine Compound (trimethoxyboroxine) | 10 | 10 | 10 | 10 | 10 | 10 | 10 | 10 | 10 | 10 | 10 | 10 | 10 | 10 | 10 |
| Phenyl Substituted Alkyl Alcohol (benzyl alcohol) | 3 | 3 | 3 | 3 | 3 | 3 | 3 | 3 | 3 | — | — | — | — | — | — |
| Novolac-Type Epoxy Resin (DEN-431) | 90 | 90 | 90 | 45 | 45 | 45 | — | — | — | — | — | — | — | — | — |
| Bisphenol-F-Type Epoxy Resin (EPICLON-830) | — | — | — | 45 | 45 | 45 | 90 | 90 | 90 | 90 | 90 | 90 | 90 | 90 | 90 |
| Phosphite Compound (triphenyl phosphite) | 10 | — | 5 | 10 | — | 5 | 10 | — | 5 | — | — | — | — | — | — |
| Phosphate Compound (Fyrol CEF) | — | 10 | 5 | — | 10 | 5 | — | 10 | 5 | — | 10 | 15 | 20 | 25 | 30 |
| Silane Compound (A-187) | 1 | 1 | 1 | 1 | 1 | 1 | 1 | 1 | 1 | — | — | — | — | — | — |
| Burn-through time at approximately 6000° F. (sec.) | 1.6 | 1.6 | 1.5 | 1.9 | 1.9 | 1.8 | 2.4 | 2.2 | 2.0 | 2.0 | 3.0 | 3.0 | 3.0 | 2.0 | 2.0 |
| Percentage change in heat resistance | control | 0% | −6% | +19% | +19% | +13% | +50% | +38% | +25% | control | +50% | +50% | +50% | 0% | 0% |

Figure 15:
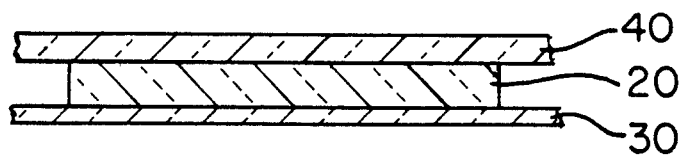
FIG. 15 is a cross-sectonal view of the transparency composite having an intense heat-resistant interlayer having a chlorophosphate compound.

100 parts of the boroxine compound or from about 1 part to about 40 parts per 100 parts of the epoxy resin dramatically increases the intense heat-resistant properties of the interply 20, as seen in FIG. 15, at high temperatures, typically greater than 2000° F.

Alternately, the concentration of the phosphate compound may be from about 50 parts to 250 parts per 100 parts of the boroxine or from about 5 parts to about 30 parts per 100 parts of the epoxy resin. The addition of this amount of the preferred chlorophosphate compounds described above provides sufficient phosphorus in the resin to increase the time of burn-through of a casting of interply 20, as seen in FIG. 16 and the following tables.

A comparison of the phosphate compound with the phosphite compound demonstrates the preference of the phosphate compounds. In the production of the phosphite compounds, trace amounts of water are impurities which generate the production of phenol during the curing of the interply 20. The generation of free phenol accelerates gel times which must be retarded as seen in FIG. 4 to permit larger castings. Substitution of the phosphate compound for its synergistic heat-resistant properties into interply 20 avoids the presence of water impurities in the phosphite compounds, which permits a control over the gel time of the larger cast- As may be seen by reference to Table II, variations of the formulations 1-9 demonstrate the substitution of the phosphate compound in interply 20 compared with a phosphite compound in interply 20. When coupled with the reaction processing advantages of the phosphate compound, the substitution of the phosphate compound for the phosphite compound is desirable. Therefore, the use of interply 20 having phosphate compounds therein for any heat-resistant interlayer 20 in any laminate described herein is possible and within the concept of this invention. Testing for formulations 1-9 for burn-through time at approximately 6000° F. was conducted with a laminate structure identified in FIG. 15 where plies 30 and 40 were acrylic.

An examination of formulations 10-15 in Table II, in comparison with FIG. 16, demonstrates the ability of an interply 20 having a phosphate compound to resist the penetration of high heat sources. Formulations 10-15 demonstrate an increasing concentration of the phosphate to an interply 20 having 30 parts by weight of phosphate compound. As seen in FIG. 16, three samples of each formulation was exposed to a heat source developing temperatures at about 6000° F. The reciprocal of penetration in inches demonstrates the resistance of each formulation to exposure time in seconds. Consequently, it is apparent that an optimal concentration of the phosphate ranges between about 10 parts by weight to about 20 parts by weight. Indeed, formulations 11–13 were capable of withstanding exposure times for a period of about three seconds which exceeds the burn-through time for any of the formulations 1–9. Therefore, it is optimal to have from about 10 to about 20 parts of the phosphate compound in interply 20. Again, testing of interply 20 occurred using a laminate seen in FIG. 15 where inside and outside plies 30 and 40 respectively were both acrylic.

Referring again to Table II, it is also apparent that the epoxy resin may desirably be a bisphenol-F type epoxy resin. Comparison of formulations 1–3 with formulations 7–9 demonstrate a percentage change in heat resistance when the novolac type epoxy resin is substituted with the bisphenol-F type epoxy resin.

Figure 2:
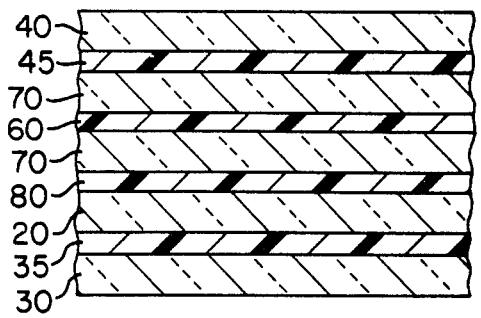
FIG. 2 is a cross-sectional view of the clad transparency composite having the intense heat-resistant interlayer.

Referring now to FIG. 2, the importance of intense heat-resistant epoxy resin interply 20 in a clad composite transparency may be understood. This transparency 50 is shown cross-sectionally to demonstrate the effectiveness of a particular clad composite format. Clad outside ply 30 having binding means 35 is secured to intense heat-resistant resin interply 20 comprising an epoxy resin cured with adducts of trimethoxyboroxine and benzyl alcohol alone or together with triphenyl phosphite. Alternatively, interply 20 may be cured with a boroxine compound and a phosphate compound, alone or together with a phenyl-substituted alcohol. A silicone interlayer 80 functions as a flexible adhesive to the opposite surface of interply 20 to a silicate layer 70 typically composed of soda lime glass, borosilicate glass, aluminosilicate glass, silica glass or 96 percent silica glass. On the opposite side of silicate layer 70 is an interlayer 60 which consists of a silicone or polyurethane or polyvinyl butyral interlayer. On the opposite side of interlayer 60 is a second silicate layer 70. On the opposite side of the second silicate is binding means 45 which consists of a silicone or polyurethane interlayer. On the opposite side of the binding means 45 is the inside ply 40 of the composite, composed of the same materials as discussed above, including polycarbonate.

However, it is also possible to utilize a mercaptan resin for any or all of binding means 35 and 45 and interlayers 60 and 80. The importance of such mercaptan resin in moisture permeability resistance for composite 50 is described below.

It has been found that the combination of three layers 20, 30, 35, 40, 45, 60, 70 and 80, in the order described above, provides a synergistic resistance greater than the application of layers 30 and 40 surrounding interlayer 20. Clad outer layer 30 may be selected from those transparent materials commonly known to those skilled in the art, as described above and typically be acrylic.

Figure 5:
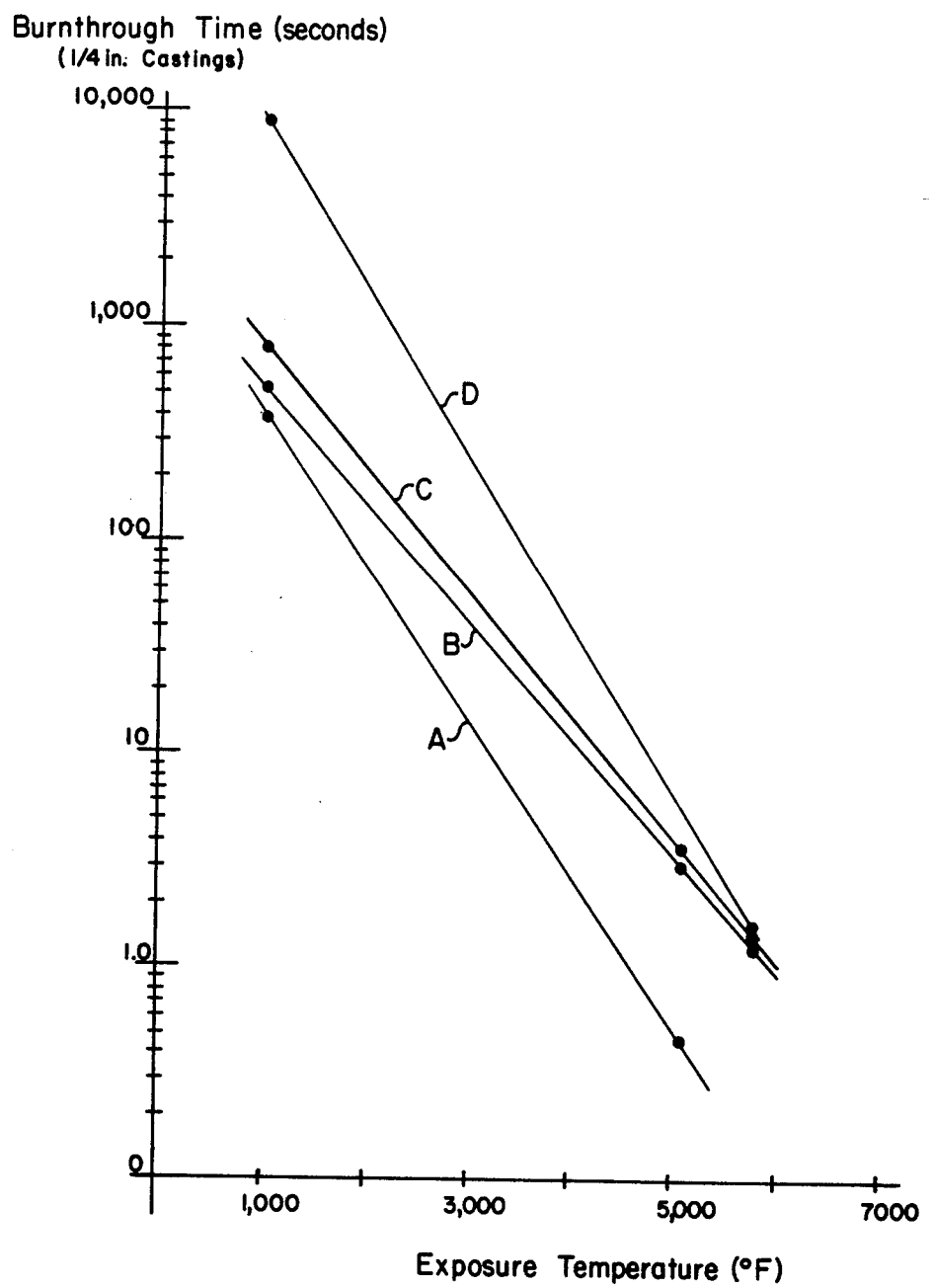
FIG. 5 is a graph showing the increased burn-through resistance on the transparencies having benzyl alcohol and triphenyl phosphite.

For an understanding of the improved heat-resistant properties of interply 20, reference is had to FIG. 5.

TABLE III

HEAT-RESISTANT TRANSPARENCIES - RELATIONSHIP BETWEEN BURN-THROUGH TIME AND EXPOSURE TEMPERATURE

| | Line | | | |
|---|---|---|---|---|
| | A | B | C | D |
| Trimethoxyboroxine | 7.5 | 10 | 10 | 7.5 |
| Benzyl alcohol | — | 5 | 3 | 2.5 |
| Triphenyl phosphite | — | 5 | 10 | — |
| DER-332 | 100 | — | — | — |
| DEN-431 | — | 85 | 90 | 90 |
| Heloxy-68 | — | 15 | — | — |

TABLE III-continued

HEAT-RESISTANT TRANSPARENCIES - RELATIONSHIP BETWEEN BURN-THROUGH TIME AND EXPOSURE TEMPERATURE

| | Line | | | |
|---|---|---|---|---|
| | A | B | C | D |
| Silane A-187 | — | 1 | 1 | 1 |
| Diphenyl phosphite | — | — | — | 15 |
| Burn-through at 2000° F. (sec.) | 378 | 522 | 790 | 9000 |
| Burn-through at 6000° F. (secs.) | 0.4 | 3.0 | 3.7 | 5.8 |

It can be seen from FIG. 5 that by the addition of benzyl alcohol, a higher concentration of trimethoxyboroxine can be incorporated, resulting in improved, burn-through resistance at 2000° F. and at 6000° F.

Transparencies 10 and 50 which contain interply 10 may be utilized in various military and industrial applications. Typically, these applications may include the use of transparencies in military hardware and aircraft, as well as spacecraft. Further, industrial applications include transparencies where protection against the thermal effects of fossil fuel fires, nuclear blasts and high energy radiation are required.

The lasting success of any transparency composite, designed to withstand high heat resistance, impact resistance, ballistic resistance, and abrasion resistance remains dependent upon its continuing transparent nature. The plurality of layers of composites 10 and 50 and the chemical composition of each layer are differentially susceptible to the permeation of moisture into and through the layers. The retention of moisture between and within the various layers of this invention and any conventional transparency composite having multiple layers creates a haze which disrupts clarity of light transmissions through the transparency composite.

A barrier to the generation of haze is necessary for any multi-layer transparency composite. The layers 35 and 45 and interlayers 60 and 80 have been found to provide the most effective permeation barrier, resistant to moisture permeability into central layers, such as heat-resistant interlayer 20 and silicate layers 70 as seen in FIG. 1 and FIG. 2, or for heat-resistant interlayers 20 having phosphate compounds therein.

The composition for the binding means 35 and 45 and interlayers 60 and 80 comprises about 100 parts by weight of a mercaptan terminated resin, from about 40 to about 250 parts by weight of an epoxy resin, and from about 0.5 to about 4.0 parts by weight of a silicane catalyst.

The mercaptan terminated resin is an aliphatic hydrocarbon-based compound having a thio reactive group terminating each end of the molecule. The mercaptan has the following general formula:

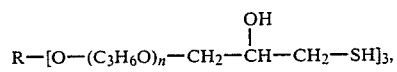

$$R-[O-(C_3H_6O)_n-CH_2-\overset{\overset{\displaystyle OH}{|}}{CH}-CH_2-SH]_3,$$

where R is an aliphatic hydrocarbon having from 1 to 18 carbon atoms and n is 1 or 2. The mercaptan resin is a material commercially available from Diamond Shamrock Corporation and sold identified as DION-3-800LC.

The epoxy resin of the binding means 35 or 45 or interlayer 60 or 80 is composed of epoxy resins previously disclosed with reference to interply 20. Typical epoxy resins include, but are not limited to, bisphenol-A type, bisphenol-F type, and novolac type epoxy resins. A preferred concentration of the epoxy resins depends on the type of epoxy resin used. For an epoxy-novalac type resin, the preferred concentration is about 100 parts by weight. Epoxy resins commercially available include DER-332, a product of Dow Chemical Company.

The silane catalyst of the binding means 35 or 45 or interlayer 60 or 80 is composed of an amine terminated silane compound such as N-aminoalkyl-aminoalkyl-trialkoxysilanes of the formula

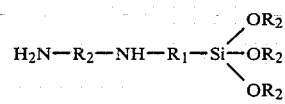

wherein $R_1$ is an alkylene having 1-6 carbon atoms and $R_2$ is an alkyl, having 1-6 carbon atoms, and aminoalkyl-trialkoxysilanes of the formula

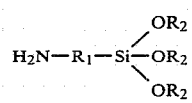

wherein $R_1$ and $R_2$ are as defined above.

Examples of preferred silanes are gamma aminopropyl triethoxy silane and norma beta aminopropyl gamma aminopropyl trimethoxy silane. The preferred concentration of the amino-silane catalyst is about 2.5 parts by weight. The aminosilane is commercially available from Union Carbide in their A-1110 and A-1120 formulations.

As expressed above, the binding means 35 or 45 and interlayer 60 or 80 have traditionally employed conventional silicones, urethanes, and epoxies. However, use of the mercaptan interlayer for these purposes provides unexpected improvement to resistance to moisture permeation. The following table compares the test samples having various composite constructions, including a construction having outer ply 30, heat-resistant interlayer 20, binding means 45 and inner ply 40, such as that seen in FIG. 11, and a construction having no binding means 35 or 45.

TABLE IV

| Composite Number | Composite Component | Thickness (in.) |
|---|---|---|
| 1 | polycarbonate (30) | 0.256 |
|  | silicone resin (35) | 0.1 |
|  | heat-resistant interlayer (20) | 0.236 |
|  | silicone resin (45) | 0.1 |
|  | polycarbonate (40) | 0.256 |
| 2 | polycarbonate (30) | 0.256 |
|  | mercaptan interlayer (35) | 0.1 |
|  | heat-resistant interlayer (20) | 0.236 |
|  | mercaptan interlayer (45) | 0.1 |
|  | polycarbonate (40) | 0.256 |
| 3 | as-cast acrylic (30) | 0.125 |
|  | heat-resistant interlayer (20) | 0.236 |
|  | as-cast acrylic (40) | 0.125 |
| 4 | as-cast acrylic (30) | 0.125 |
|  | heat-resistant interlayer (20) | 0.236 |
|  | silicone resin (45) | 0.1 |
|  | polycarbonate (40) | 0.256 |
| 5 | as-cast acrylic (30) | 0.125 |
|  | heat-resistant interlayer (20) | 0.236 |
|  | mercaptan layer (45) | 0.1 |
|  | polycarbonate (40) | 0.256 |
| 6 | stretched acrylic (30) | 0.1 |
|  | heat-resistant interlayer (20) | 0.125 |
|  | stretched acrylic (40) | 0.1 |
| 7 | urethane (30) | 0.1 |
|  | heat-resistant interlayer (20) | 0.236 |
|  | urethane (40) | 0.1 |
| 8 | urethane (30) | 0.1 |
|  | silicone resin (35) | 0.1 |
|  | heat-resistant interlayer (20) | 0.236 |
|  | silicone resin (45) | 0.1 |
|  | urethane (40) | 0.1 |
| 9 | urethane (30) | 0.1 |
|  | mercaptan interlayer (35) | 0.1 |
|  | heat-resistant interlayer (20) | 0.236 |
|  | mercaptan interlayer (45) | 0.1 |
|  | urethane (40) | 0.1 |
| 10 | as-cast acrylic (30) | 0.08 |
|  | heat-resistant interlayer (20) | 0.236 |
|  | as-cast acrylic (40) | 0.08 |
| 11 | as-cast acrylic (30) | 0.1 |
|  | silicone resin (35) | 0.1 |
|  | heat-resistant interlayer (20) | 0.236 |
|  | silicone resin (45) | 0.1 |
|  | as-cast acrylic (40) | 0.1 |
| 12 | as-cast acrylic (30) | 0.08 |
|  | mercaptan interlayer (35) | 0.1 |
|  | heat-resistant interlayer (20) | 0.236 |
|  | mercaptan interlayer (45) | 0.1 |
|  | as-cast acrylic (40) | 0.08 |

The composites of Table IV were tested under extreme temperature and humidity conditions. The direct comparison of the performance of the mercaptan resin of the present invention and the performance of the conventional silicone resin, or no binding means at all, may be seen in the graphs of FIGS. 6-9.

Figure 6:
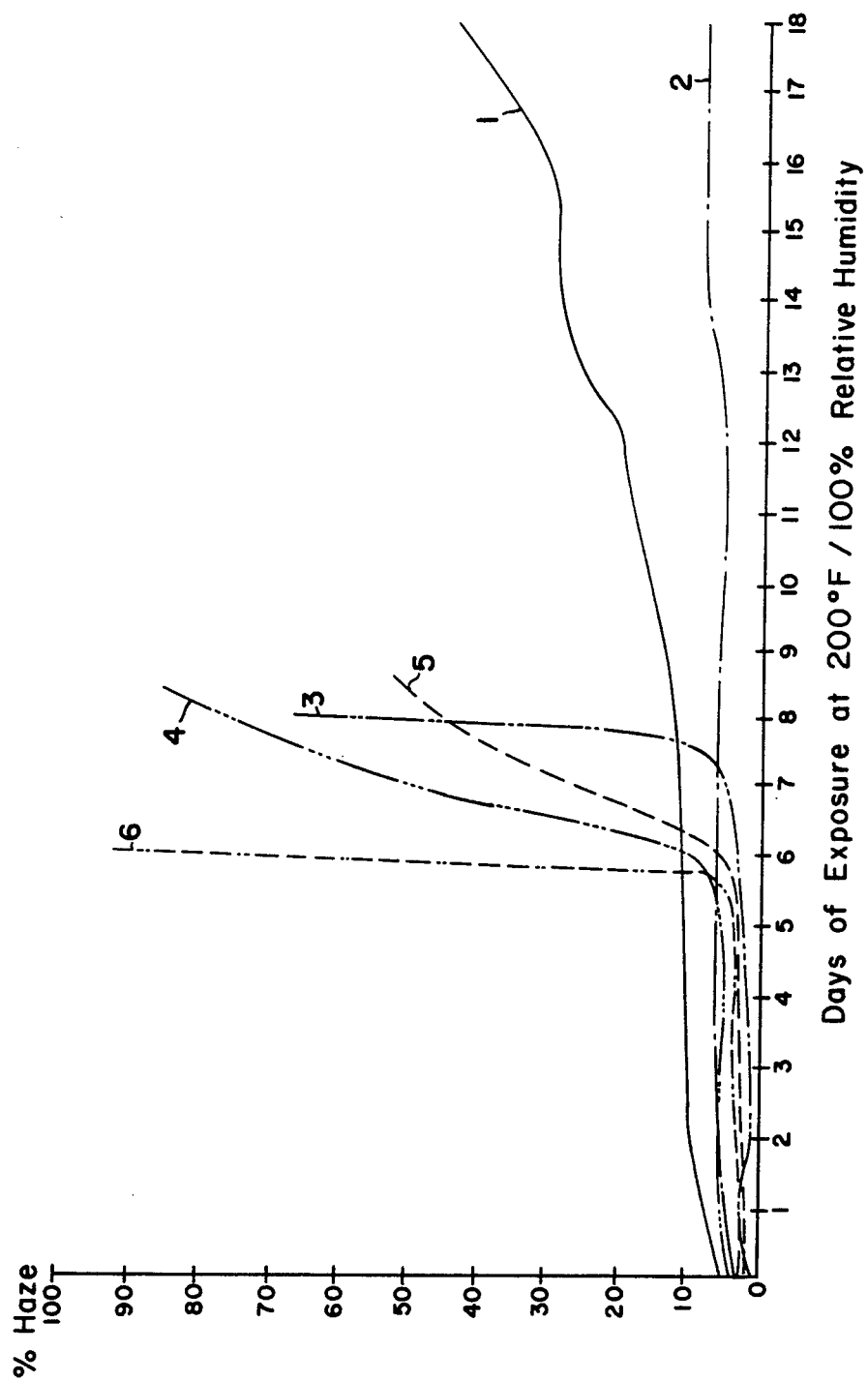
FIG. 6 is a graph showing the increased resistance to moisture permeability of mercaptan resin binding means bonded to various transparency layers when exposed to temperatures of about 200° F. and 100 percent relative humidity.

In FIG. 6, the percent of haze occurring in the composite is compared with the days of constant exposure of the composite at 200° F. and 100 percent relative humidity. All other parameters constant, a direct comparison of composite No. 2 with the mercaptan interlayer of the present invention demonstrates the increased resistance to moisture permeation in the latter composite. Likewise, a direct comparison of composite Nos. 4 and 5 show the increased resistance to moisture permeation in the latter composite. Composites No. 2 and 5 are clearly superior to their counterparts No. 1 and No. 4, as well as No. 3 and No. 6 which do not provide any binding means moisture permeation protection.

Figure 7:
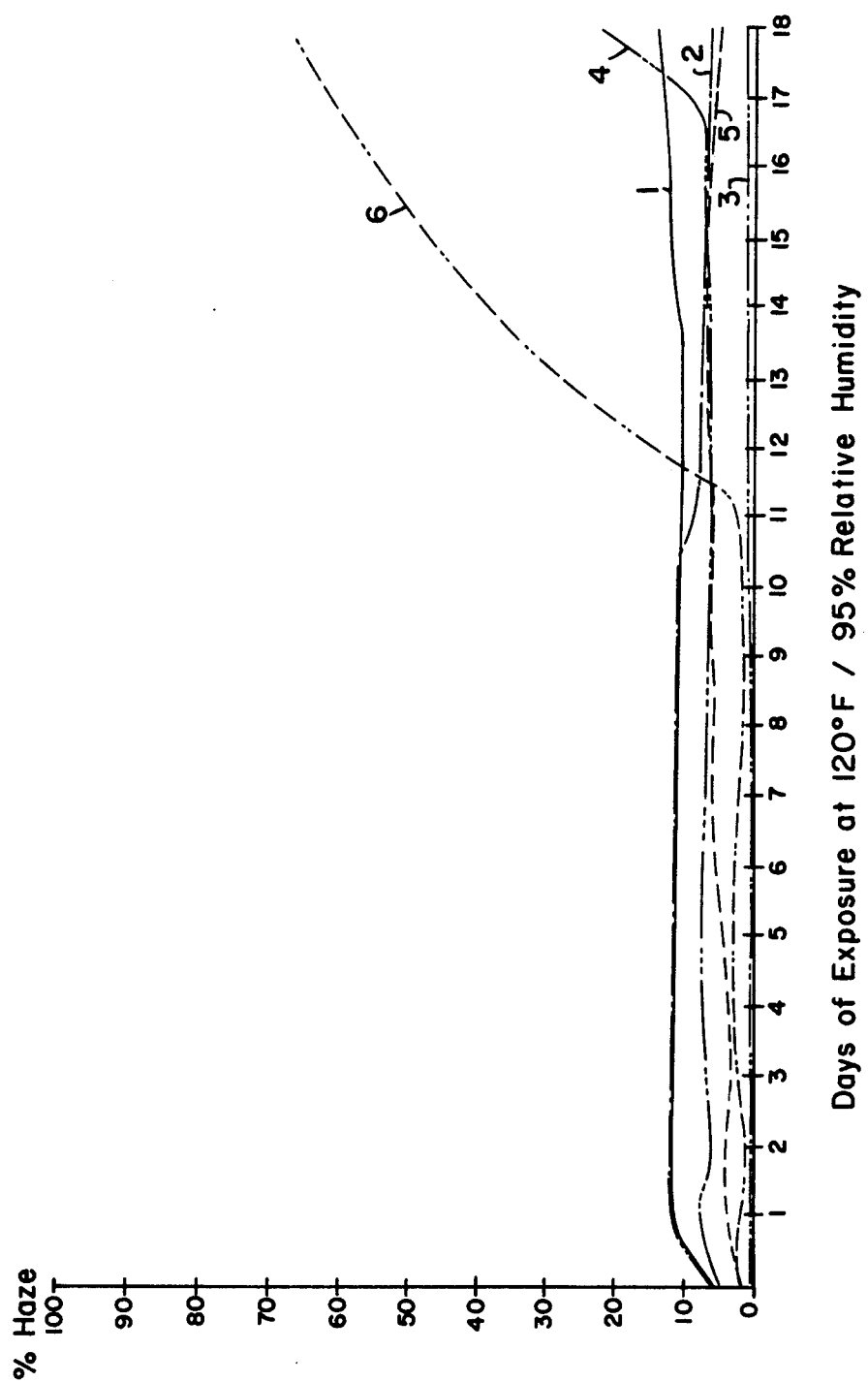
FIG. 7 is a graph showing the increased resistance to moisture permeability of mercaptan resin binding means bonded to various transparency layers when exposed to temperatures of about 120° F. and 95 percent relative humidity.

In FIG. 7, a graph showing the effect of constant exposure to 120° F. and 95 percent relative humidity to the same six composites is seen. While not as pronounced as that seen in FIG. 6, the comparison of composites No. 1 and No. 2 and of composites No. 4 and No. 5 clearly indicates the superiority of the mercaptan interlayer binding means over the silicone resin binding means.

Figure 8:
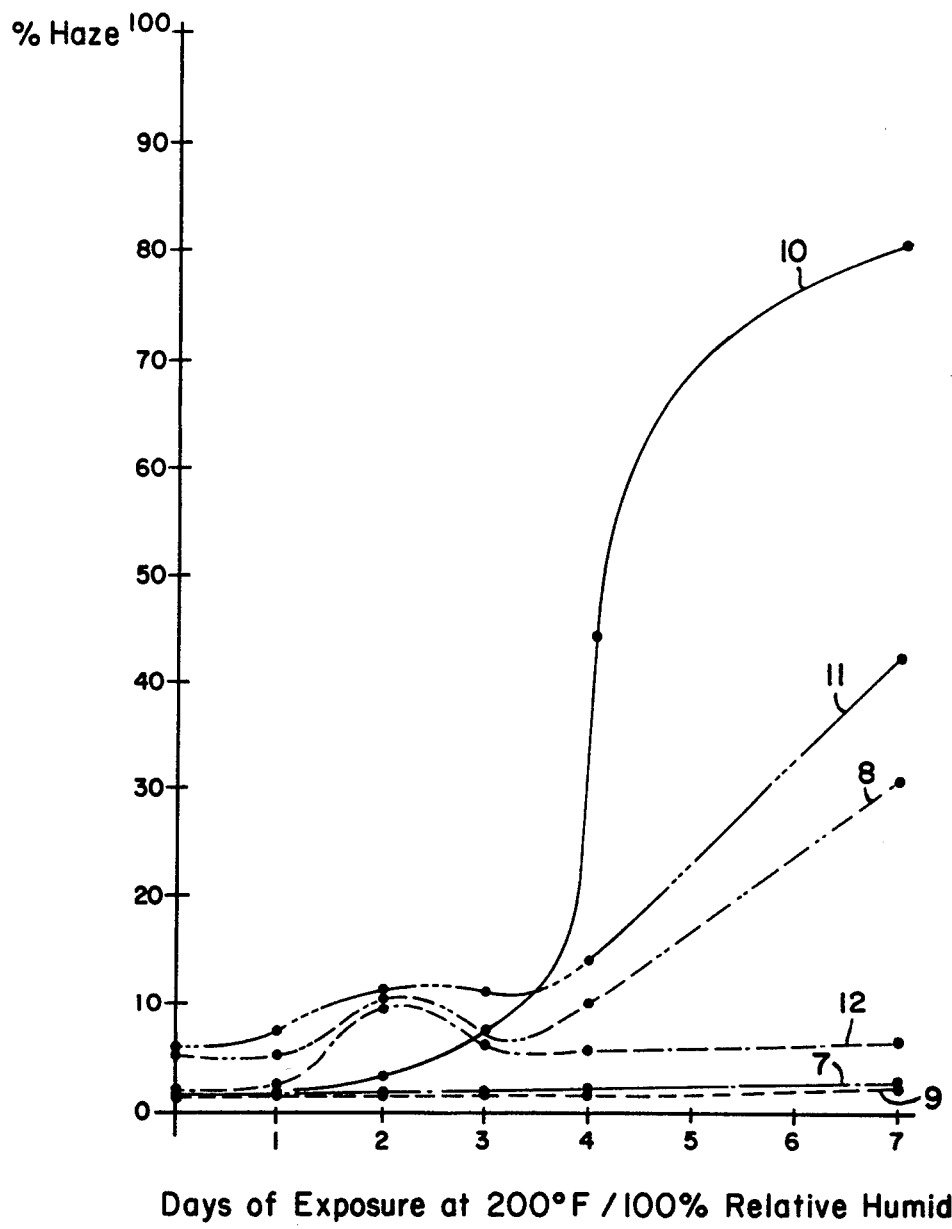
FIG. 8 is a graph showing the increased resistance to moisture permeability of mercaptan resin binding means bonded to other various transparency layers when exposed to temperatures of about 200° F. and 100 percent relative humidity.

In FIG. 8, the graph showing the test of exposure at 200° F. and 100 percent relative humidity for the remaining six composites is seen. A direct comparison of composites Nos. 8 and No. 9, where the only difference is the substitution of mercaptan interlayer for silicone resin, demonstrates the clear superiority of the mercaptan resin in resistance to haze as caused by moisture permeation. Further, a comparison of composites No. 11 and No. 12, substituting mercaptan interlayer for silicone resin, demonstrates the superiority of the mercaptan interlayer of the present invention over conventional binding means.

Figure 9:
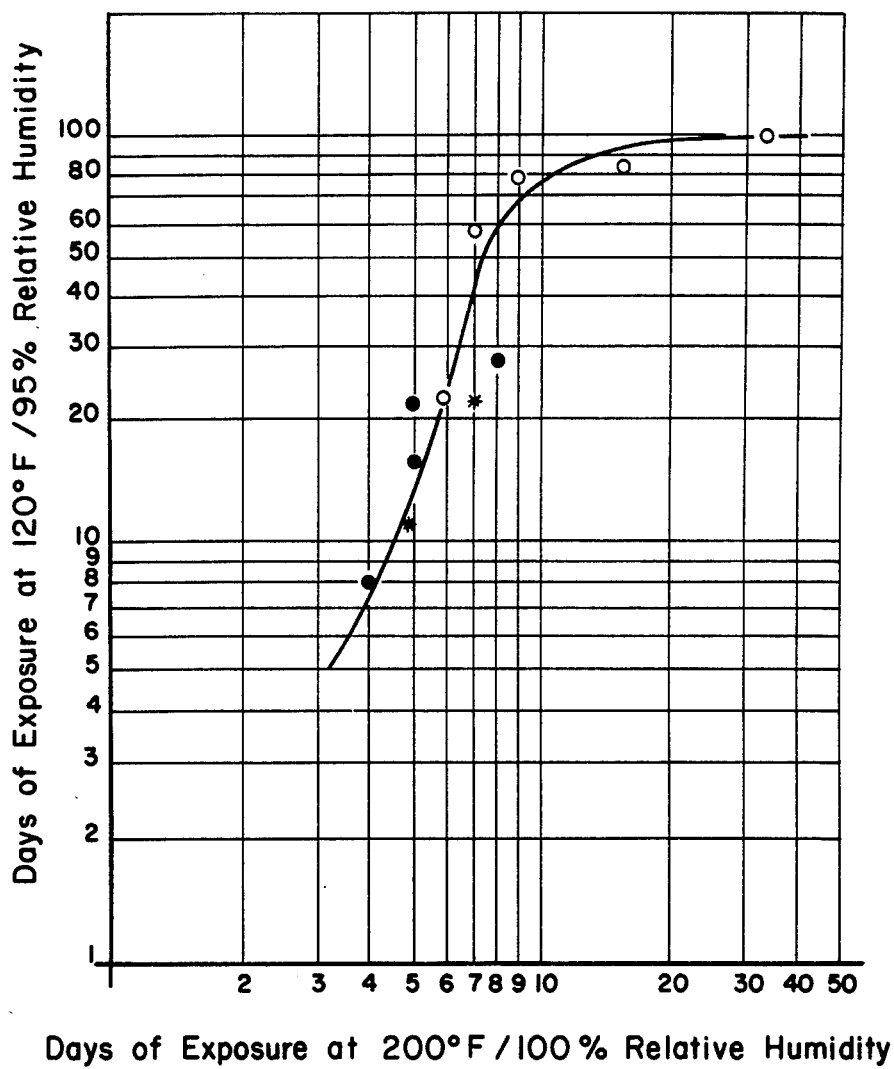
FIG. 9 is a graph showing the composite evaluation of various interlayer binding means and the effectiveness of resistance to moisture permeability.

FIG. 9 summarizes the superiority of the mercaptan interlayer of the present invention over conventional or no resin by comparing performance at 200° F./100 percent relative humidity with performance at 120° F./95 percent relative humidity. At identical acceptable percentage haze levels, the mercaptan interlayer could last as long as 100 days at 120° F./95 percent relative humidity and 35 days at 200° F./100 percent relative humidity. By comparison, the silicone resin could only withstand about 22 days at 120° F./95 percent relative humidity and 8 days at 200° F./100 percent relative humidity.

FIGS. 6-8 also demonstrate that the mercaptan interlayer of the present invention is effective for conventional outer and inner plies 30 and 40: acrylic, polycarbonate, urethane, and any combinations of them. Moreover, the mercaptan interlayer is available to replace the conventional silicone, epoxy, or urethane resins for any transparency composite using any conventional transparency including silicates commonly known as glass. Indeed, the mercaptan interlayer of the present invention is an effective interlayer 60 and 80 for clad composite transparency 50 as seen in FIG. 2.

Table V below demonstrates a comparison of the specific permeability values for various formulations of the mercaptan interlayer and the conventional silicone and other resins. The specific permeability of a film to moisture is defined as the milligrams of water that permeate one square centimeter of film of 1 millimeter thickness each 24 hours after a constant rate has been attained under the preferred conditions of 25° C. and using 100 percent relative humidity inside the cup and a phosphorus pentoxide desiccated atmosphere outside the cup. The formula f calculation is $$SP = \frac{W[T(25.4 \text{ mm/in})]}{A}$$

where SP is specific permeability, W is weight loss in milligrams in a 24 hour period, T is the film thickness in inches, and A is exposed cup surface area.

TABLE V

| Type of Resin | Film Thickness | Specific Permeability[4] (ASTM D-1632-62) |
| --- | --- | --- |
| mercaptan interlayer[1] | 0.098 | 0.4978 |
| mercaptan interlayer[2] | 0.124 | 0.0627 |
| mercaptan interlayer[3] | 0.114 | 0.4633 |
| low-strength silicone | 0.100 | 4.8539 |
| low-strength RTV silicone | 0.104 | 4.2270 |
| high-strength silicone | 0.100 | 4.8768 |
| high strength RTV silicone | 0.118 | 5.4549 |
| pigmented RTV silicone | 0.101 | 4.0020 |

[1]Mercaptan interlayer comprising 100 parts by weight of mercaptan resin, 100 parts by weight of epoxy resin, and 2 parts by weight of silane catalyst.
[2]Mercaptan interlayer comprising 100 parts by weight of mercaptan resin, 50 parts by weight of epoxy resin, and 1.5 parts by weight of amino-silane catalyst.
[3]Mercaptan interlayer comprising 100 parts by weight of mercaptan resin, 100 parts by weight of epoxy resin, and 1 part by weight of amino-silane catalyst.
[4]Units in mg. mm/24 hr. cm².

Because the ideal specific permeability is near zero, it is readily seen that a mercaptan interlayer of the present invention is approximately ten times better than the conventional resins. This direct comparison demonstrates the vast superiority of a mercaptan interlayer of the present invention over those binding agents presently employed.

Two other properties significant for the interlayer of the present invention are ultimate strength and modulus. During high temperature, high humidity condition, the interlayer must maintain proper adhesion to prevent delamination of the interlayer and the other various layers in the composite. Further, the interlayer must have an acceptable rate of change of modulus during the high temperature, high humidity conditions, to prevent alteration of the interlayer effectiveness sandwiched between other layers during the course of use. For a comparison of modulus and ultimate strength properties of the interlayers of the present invention with interlayers common to those skilled in the art, reference is had to Tables VI and VII. Table VI describes the formulation of the testing material and Table VII demonstrates the effect of high temperature and high humidity on the modulus and ultimate strength properties of the formulations.

TABLE VI

FORMULATION OF INTERLAYER FOR COMPOSITE OF GLASS - INTERLAYER - POLY CARBONATE

| Formulation | Mercaptan Resin | Epoxy Resin | Amino-Silane | High Strength Silicone | Fumed Silica Compound[1] |
| --- | --- | --- | --- | --- | --- |
| 1 | 100 | 100 | 2 | — | — |
| 2 | 100 | 150 | 2 | — | — |
| 3 | 100 | 175 | 2 | — | — |
| 4 | 100 | 200 | 3 | — | — |
| 5 | — | — | — | 100 | 5 |
| 6 | — | — | — | 100 | — |

[1]A thixotropic agent available commercially as CAB-O-SIL EH-5.

TABLE VII

| Days of Exposure at 120° F./ 95% Relative Humidity | Torsional - Shear Modulus/Ultimate Strength (PSI) Formulation | | | | | |
| --- | --- | --- | --- | --- | --- | --- |
|  | 1 | 2 | 3 | 4 | 5 | 6 |
| 1 | 210/771 | 78/148 | 25/62 | 28/60 | 25/43* | 16/53 |
| 2 | 207/450 | — | 22 | 22 | 6/8** | — |
| 3 | — | — | — | — | — | 22/72 |
| 4 | — | — | — | — | — | 7/19** |
| 6 | 190/291 | 49/110 | — | 33/67 | 6/10 | — |
| 7 | — | — | 33/65 | — | — | — |
| 14 | 166/266 | 73/122 | — | 98/153 | 9/14 | — |
| 15 | — | — | 55/101 | — | — | — |
| 27 | 85/200 | — | — | 105/289 | — | — |

*Haze Appeared
**Delamination Started

As is seen from an examination of Table VII, a variation in the formulation of the inner layer of the present invention may control the modulus and its rate of exchange during the days of exposure to high-temperature/high-humidity conditions. Over the course of the period examined, the ultimate strength and its rate of change could be controlled by the type of formulation of the interlayer. Generally, with increasing epoxy resin concentration, the modulus and ultimate strength comparisons during the days of the exposure increased when the epoxy was greater than 150 parts per 100 parts of mercaptan resin.

Table VII also demonstrates the clear superiority of the interlayer formulations of the present invention over those interlayer compositions known to those skilled in the art. On the first day, formulation No. 5 exhibited haze, and by the fourth day, both silicone formulations started to delaminate from the composite of glass-interlayer-polycarbonate. In comparison to this, the formulations 1 and 4 lasted as long as 27 days when the experiment was concluded to report these results. Furthermore, the interlayer formulations of the present invention have a variety of modulus and ultimate strength properties to meet various commercial applications depending upon the materials between which the interlayer is sandwiched.

transparent and may be translucent or opaque with the addition of thixotropic agents, such as fumed silica compounds, or fillers. Indeed, slot filler 105 and edge sealer 95 may merge into a perimeter sealant.

The edge sealer 95 and the slot filler 105 demonstrates significant improvements over the use of high-strength silicones known to those skilled in the art. An examination of Table VIII demonstrates the moisture impermeability of the mercaptan compositions over that of the high-strength silicone.

TABLE VIII

EXAMINATION OF GLASS-SILICONE-POLYCARBONATE COMPOSITES WITH EDGE SEALERS AND SLOT FILLERS EXPOSED 29 DAYS AT 120° F./95% R.H.

| | PANEL NO. 1 | PANEL NO. 2 | PANEL NO. 3 | PANEL NO. 4 | PANEL NO. 5 |
|---|---|---|---|---|---|
| SLOT FILLER (105) | | HIGH-STRENGTH SILICONE PLUS 5% BY WGT. CAB-O-SIL EH-5 (Fumed Silica Compound) | | MERCAPTAN* COMPOSITION PLUS 5% BY WGT. CAB-O-SIL EH-5 (Fumed Silica Compound) | MERCAPTAN** COMPOSITION PLUS 5% BY WGT. CAB-O-SIL EH-5 (Fumed Silica Compound) |
| EDGE SEALER (95) | NONE | MERCAPTAN COMPOSITION* PLUS 5% BY WGT. CAB-O-SIL EH-5 (Fumed Silica Compound) | MERCAPTAN COMPOSITION** PLUS 5% BY WGT. CAB-O-SIL EH-5 (Fumed Silica Compound) | MERCAPTAN COMPOSITION* PLUS 5% BY WGT. CAB-O-SIL EH-5 (Fumed Silica Compound) | MERCAPTAN COMPOSITION** PLUS 5% BY WGT. CAB-O-SIL EH-5 (Fumed Silica Compound) |
| INTERLAYER (HIGH-STRENGTH SILICONE) (45) | Slot Filler can be removed | Edge sealer cut off Slot-Filler could be removed with manual difficulty | Edge sealer cut off Slot-Filler could be removed with difficulty | Edge sealer cut off Slot-Filler could be removed with difficulty | Edge sealer cut off Slot-Filler had to be dug out |
| | Silicone interlayer can be readily delaminated from glass and polycarbonate | Silicone interlayer could be delaminated from both. The adhesion was much better than Panel No. 1 | Silicone interlayer could be delaminated from glass only - was better than Panel No. 1 | Silicone interlayer appeared to be well bonded | Silicone interlayer appeared to be well bonded - minor spot delaminations |

*Mercaptan Resin 100
Epoxy Resin 100
Amino-Silane 2
**Mercaptan Resin 100
Epoxy Resin 200
Amino-Silane 2

From an examination of FIGS. 13 and 14, it is possible to optimize the formulation for modulus stability and ultimate strength stability. FIG. 13 demonstrates in graphic form the information shown in Table VI for a comparison of initial modulus with the modulus after 14 days of exposure. A ratio of epoxy resin/mercaptan resin exhibits stability over the 14 days in the range of 1.5 and 1.8. Likewise, this ratio is confirmed for ultimate strength comparisons as seen in FIG. 14.

Figure 10:
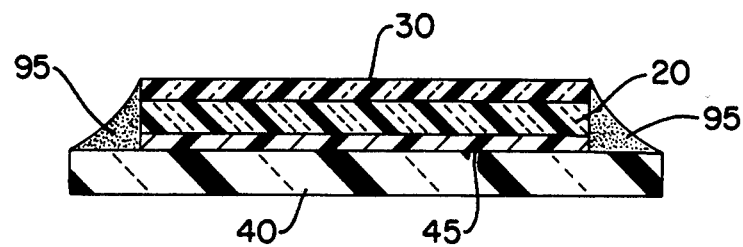
FIG. 10 is a cross-sectional view of a transparency composite at an edge as sealed by edge sealant material of the present invention.

The mercaptan composition of the present invention is effective, not only to resist moisture permeation between plies of transparent composite construction. As seen in FIG. 10, edge sealant 95 may seal edges of outer ply 30, heat-resistant interlayer 20, binding means 45 (either of the invented composition or a conventional composition) and the upper surface of inner layer 40. The composite shown in FIG. 10 is the same as the composite 90 shown in FIG. 11, typical of transparent composites used in high elevation aircraft. Edge sealer 95 is likewise useful to seal edges of composites 20 and 50 shown in FIG. 2 or any conventional transparent composite, either with inner ply 40 extending beyond the other transparency components or cut at the same place as the other transparency components.

Figures 11, 12:
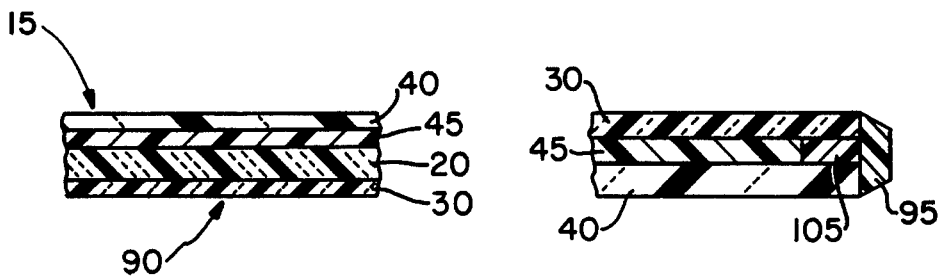
FIG. 11 is a cross-sectional view of a transparency composite having no interlayer binding means between the intense heat-resistant interlayer and the outside ply.
FIG. 12 is an illustrative view of a transparency composite having a slot to be filled and an edge sealant material.

The mercaptan composition may also fill in the slot created during the manufacture of the transparency on the outside edge of any transparency composite. As seen in FIG. 12, this slot filler 105 combines the functions of the edge sealant 95 and the interlayer 45. Neither the slot filler 105 nor the edge sealant need be Each panel was subjected to 29 days of exposure at 120° F. and 95 percent relative humidity. Panel No. 1 only had a high-strength silicone slot filler and once that was removed, it was apparent that the silicone interlayer could be readily delaminated from both the glass and the polycarbonate layers. In contrast to this, the mere addition of an edge sealer having one mercaptan composition plus the thixotropic agent increase the performance of the composite during the 29 days of exposure. After the edge sealer 95 was cut off, the slot filler 105 could only be removed with manual difficulty. However, the silicone interlayer could be delaminated from both the glass and polycarbonate, although the adhesion was better than that found in Panel 1. By increasing the epoxy resin concentration, Panel 3 demonstrated some improvement over that seen for Panel 2. In this case, after the edge sealer and slot filler were cut off and removed with manual difficulty, the silicone interlayer could be delaminated from only the glass layer. While Panels 2 and 3 represent improvement over the conventional performance of Panel 1, Panels 4 and 5 provide even greater improvement.

By using the mercaptan compositions for both slot filler 105 and edge sealer 95, the interlayer was significantly protected from moisture permeation. For the interlayers of Panels 4 and 5, the combination of the edge sealer and slot filler provided the protection to maintain a bond between the silicone interlayer and both the glass and polycarbonate. Indeed, using this second mercaptan composition, slot filler 105 had to be dug from the periphery of the Panel No. 5.

The mercaptan compositions of the present invention not only serve as an interlayer, but also may serve as an edge sealer or slot filler. The variety of combinations of transparent composites which may employ the composition of the present invention in these various functions is within the scope of the invention.

BEST MODE FOR CARRYING OUT THE INVENTION

According to further concepts of the present invention, an improved mercaptan resin composition is formed through the utilization of a different catalyst. Deletion of the above-noted silane catalysts and utilization of an amino-titanate catalyst has been found to result in a soft and clear composition having good ultimate tensile strength, low modulus and high elongation. Moreover, the composition has good adhesion, which is much improved over adhesion of the above-noted mercaptan compositions utilizing a silane catalyst. The moisture resistance is also very good. In addition as functioning as a composition, the amino-titanate catalyzed mercaptan resin can be utilized, as above, in connection with high heat-resistant layers, or laminates. It can also be utilized as an edge sealant with regard to various transparent plastics, glass, and the like, as well as to generally function to protect any inner core item against moisture.

Considering the mercaptan catalyzed composition, it has approximately 100 parts by weight of a mercaptan resin, as noted above, for example having a thio reactive group terminating each end of the molecule. Generally, any type of mercaptan resin can be utilized including one having the above-noted formula, i.e.

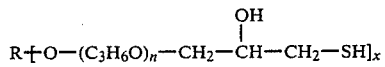

where n is 1 or 2, and x is 2 or 3, preferably 3. Although R in said formula can be an aliphatic having from 1 to 18 carbon atoms, desirably it an alkyl group having from 1 to 11 carbon atoms and preferably 3 carbon atoms. The composition also contains an epoxy resin of any conventional type such as the specific types noted above in an amount of from about 20 to about 300 parts by weight, desirably from about 25 to about 250 parts by weight, and preferably from about 25 to about 200 parts by weight per 100 parts of said mercaptan resin. Examples of epoxy resins include cycloaliphatic and aliphatic epoxies such as diglycidyl ether bisphenol A (DER-732) manufactured by Dow Chemical Company, diglycidyl ether bisphenol F (Epiclon-830) manufactured by Dainippon Ink. and Chemicals, and epoxy novalac (DEN-431) manufactured by Dow Chemical Company, and 1,4-butane diodiglycidyl ether (RD-2) manufactured by Ciba-Geigy.

The catalyst which yields improved properties is an amino-titanate catalyst as in an amount of from about 0.1 to about 4.0 parts by weight, desirably from about 0.2 to about 2 parts by weight, and preferably from about 0.3 to about 0.7 parts by weight per 100 parts by weight of said mercaptan resin. Generally any amino-titanate catalyst is suitable so long as it results in a clear or transparent composition. Generally, the aromatic containing amino-titanate catalysts are preferred since they give greater clarity and less haze. An example of a suitable formulation is as follows:

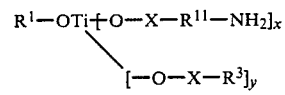

where x is 1,2 or 3, where y is 0,1 or 2 and $x+y=3$; where $R^1$ is an alkyl having 1 to 7 carbon atoms with 3 carbon atoms being preferred; X is C=O, O=S=O, or nothing; $R^{11}$ is preferably aromatic or an alkyl substituted aromatic containing from 6 to 12 carbon atoms, or an alkyl having from 1 to 8 carbon atoms, $R^2$—N-H—$R^{21}$ where $R^2$ and $R^{21}$ can be the same or different with $R^2$ and $R^{21}$ being an alkyl having from 1 to 10 carbon atoms with 1 to 3 carbon atoms being preferred; where $R^3$ is an alkyl having 1 to 25 carbon atoms, an alkyl substituted aromatic having from 10 to 25 carbon atoms or preferably an alkyl having 15 to 20 carbon atoms. The group-$R^{11}$—$NH_2$ can also be tetra ethylene triamine.

Some of the amino-titanate catalyzed mercaptan systems exhibited fast cures. This can be reduced in order to permit the necessary process steps, for example lamination with various plastics, and the like, by lowering the amount of catalyst, or by utilizing a potlife extender such as a Lewis acid, desirably a weak Lewis acid such as lactic acid, butyric acid, or acetic acid with acetic acid being preferred. The amount of acid required varies with the reactivity and equivalency of the amino titanate. Since various titanates will be more reactive than others, the amount of acid will vary accordingly. However, if too much acid is utilized, it tends to tie-up the amino-titanate catalyst and thus greatly extends and even kills the cure. Generally an amount of acid yielding a suitable potlife ranges from about 0.01 to about 0.5 parts by weight, desirably from about 0.01 to about 0.2 parts by weight and preferably from about 0.8 to about 1.2 parts by weight per 100 parts by weight of mercaptan resin.

Another aspect of the present invention is that the Lewis acids also extend the potlife of mixtures containing silane catalysts therein. That is, whenever the composition contains a mercaptan resin, and epoxy resin, as well as a silane catalyst, a Lewis acid as set forth above can be added thereto to increase the potlife thereof. The amount of the various components is as set forth above, that is 100 parts of mercaptan resin, from about 20 to about 300 parts of epoxy resin, from about 0.01 to about 0.5 parts of the Lewis acid, as well as from about 0.5 to about 4.0 parts by weight of said silane terminated compound per 100 parts by weight of said mercaptan. The various silanes which can be utilized are set forth herein above. Generally, the desired amount of Lewis acid is from about 0.05 to about 2.0 parts by weight per 100 parts of said mercaptan resin. Table XIIIA sets forth the retarding effects of acetic acid on the potlife of mercaptan interlayers having a silane catalyst therein.

TABLE XIIIA

|  | A Wt. | B Wt. | C Wt. | D Wt. | E Wt. | F Wt. |
|---|---|---|---|---|---|---|
| Dion 3-800 | 494.6 | 493.8 | 492.6 | 495 | 494.9 | 494.8 |
| DEN-431 | 494.6 | 493.8 | 492.6 | 495 | 494.9 | 494.8 |
| A-1100 | 9.9 | 9.9 | 9.9 | 9.9 | 9.9 | 9.9 |
| Acetic Acid | 1.0 | 2.5 | 4.9 | — | 0.3 | 0.5 |

TABLE XIIIA-continued

|  | A Wt. | B Wt. | C Wt. | D Wt. | E Wt. | F Wt. |
|---|---|---|---|---|---|---|
| Ratio: $\frac{\text{A-1100}}{\text{HAc}}$ | 10 | 4.0 | 2.0 | — | 33.3 | 19.8 |
| Ratio: $\frac{\text{HAc}}{\text{A-1100}}$ | 0.1 | 0.25 | 0.49 | — | 0.03 | 0.05 |
| Potlife (minutes) | 200 | >1,440.0 | 30 | 50 | 90 |  |

As apparent from the table, there is a significant improvement with the addition of acetic acid to potlife longevity.

Moisture is detrimental to transparent plastics, interlayers and the like in that it imparts haze thereto. Haze is undesirable in that it tends to reduce light transmission and visibility with regard to optical systems. It is therefore highly desirable to reduce any haze content. The present invention has been found to yield equal or reduced haze content as compared to the use of a silane catalyst. Yet, many of the physical properties are increased such as adhesion, and ultimate tensile strength. Accordingly, the mercaptan composition of the present invention can be utilized in various situations and result in a long-lasting effect with regard to light.

The utility of the present invention lies in areas wherever transparent laminates and the like are utilized. For example, the amino-titanate catalyzed composition of the present invention can be utilized as a sealing and adhesive layer coating conventional plastics, glass, or other transparent items, as an inner layer sealing and adhering two transparent layers together, as an edge sealant protecting the edge of a plastic, etc., from exposure to moisture, and the like. Specific configurations are shown in the drawings. For example, in FIG. 1, the mercaptan resin of the present invention can be utilized as layers 35 and 45 to seal various plastic or glass components together. In FIG. 2, the aminotitanate catalyzed mercaptan resin composition can function as layers 35, 45, 60 and 80. An example of utilization as an edge sealant is shown in FIG. 10. FIGS. 11 and 12 show further utilization as an inner layer as well as an edge sealant. Thus, it can be utilized for any and all the uses or combinations as set forth hereinabove.

One such use is in adhering high heat-resistant laminates together. In such systems, the high heat-resistant layer contains approximately 100 parts of various types of epoxies as set forth hereinabove and from about 5 to about 30 parts by weight per 100 parts of said epoxy, desirably from about 8 to about 15 parts by weight and preferably about 10 parts by weight of a boroxine compound as set forth above. Such high amounts of boroxine can be utilized in association with phenyl substituted alkyl alcohols wherein the alkyl portion has from about 1 to 20 carbon atoms, preferably from 1 to 10. The amount of alcohol ranges from about 1 to about 10 parts and desirably from about 1 to about 5 parts, and preferably about 3.3 parts by weight per 100 parts of said epoxy. Additionally, various phosphorus compounds having the formula set forth above can be utilized. If the phosphorus compound is a phosphite, the amount is generally from about 1 to about 40 and preferably from about 5 to about 40 parts by weight per 100 parts by weight of said epoxy. If the compound is a phosphate, or other phosphorus compounds having the above formula, the amount is from 1 to about 40, desirably from about 5 to about 30 and preferably from 10 to about 20 parts by weight per 100 parts of said epoxy. Whenever a phosphate compound is utilized, the use of the alcohol is optional. In addition to protecting various plastics such as acrylic, polycarbonate, polyurethane, and the like as in regard to an armor laminate, or glass, the amino-titanate catalyzed mercaptan can generally be utilized to protect any inner core or other materials which are moisture-sensitive and would degrade their operating purpose.

According to the present invention, various compositions were made and tested with regard to adhesion and the like. Generally, the mercaptan resin, and the epoxy resins were added to a vessel and mixed at ambient temperatures. Then, the amino-titanate compound of the present invention was added or in case of the control, the silane compound. This mixture was then mixed. A vacuum was then applied to remove any entrained air with the vacuum being approximately 100 to 150 mm of mercury. The vacuum was then broken and the mixture cast between various plates, care being taken to avoid air entrainment. The composition was then heated and cured at approximately 130° to about 190° F.

TABLE IX

|  | Silane Control | A | B | C | D |
|---|---|---|---|---|---|
| DION 3-800 | 100 | 100 | 100 | 100 | 100 |
| CY-179 | 25 | 25 | 25 | 25 | 25 |
| RD-2 | 25 | 25 | 25 | 25 | 25 |
| KR-63S | — | 2 | 1 | — | — |
| KR-26S | — | — | — | 1 | 0.5 |
| A-1100 | 2 | — | — | — | — |
| Visual Examination | Clear | Clear | Clear | Clear | Clear |
| Failure Mode* at R.T. | AP | AP | AP | C/AP | AP |

*C: Cohesive
AP: Adhesive to polycarbonate
DION 3-800, a mercaptan resin manufactured by Celanese
CY-179, an alicyclic diepoxy carboxylate manufactured by Ciba-Geigy
RD-2, 1,4-butane diol diglycidyl ether
KR-63S, isopropyl tri(tetraethylenetriamino) titanate manufactured by Kenrich Petrochemicals Inc.
KR-26S, isopropyl TRI(tetraethylene triamino) titanate manufactured by Kenrich Petrochemicals Inc.
A-1100, an amino silane manufactured by Union carbide The adhesion of formulations A, B, C and D was very good in comparison to the silane control which was only fair.

In a similar manner as set forth in Table IX, and under similar conditions, the potlife of the composition with and without an acid is set forth in Table X.

TABLE X

|  | E | F | G |
|---|---|---|---|
| DION 3-800 | 100 | 100 | 100 |
| EPICLON-830 | 100 | 100 | 50 |
| GAC 2-80 DYE | 0.33 | 0.33 | 0.33 |
| KR-63S | 0.5 | 0.5 | 0.5 |
| GLACIAL ACETIC ACID | — | 0.1 | 0.1 |
| DEN-431 | — | — | 50 |
| POTLIFE (600 grams) (minutes) @ R.T. | 40 | >150 | >60 |
| @ 130° F. | — | 120 | 60 |

EPICLON-830, a bisphenol-F type epoxy manufactured by E. F. Whitmore & Co.
GAC 2-80 DYE, optical brightener
DEN-431, novalac type epoxy resin manufactured by Dow Chemical Company Hence it is apparent that the use of 0.1 parts by weight of acetic acid greatly extended the potlife as set forth in Table X.

With regard to the modulus, the ultimate tensile strength, and elongation, such values for compositions of the present invention are set forth in Table XI.

TABLE XI

|  | 1 | 2 | 3 | 4 | Control |
|---|---|---|---|---|---|
| DION 3-800 | 100 | 100 | 100 | 100 | 100 |
| EPICLON-830 | 50 | 40 | 40 | 30 | — |
| DEN-431 | 50 | 50 | 50 | 50 | — |
| CY-179 Cycloaliphatic Epoxy | — | 10 | — | 20 | 25 |
| RD-2 | — | — | 10 | — | 25 |
| GAC 2-80 DYE | 0.33 | 0.33 | 0.33 | 0.33 | — |
| KR-63S | 0.5 | 0.5 | 0.5 | 0.5 | — |
| Glacial Acetic Acid | 0.1 | 0.1 | 0.1 | 0.1 | — |
| A-1100 | — | — | — | — | 2 |
| FAILURE MODES* |  |  |  |  |  |
| @ −60° F. | G | G | G/AG | G | G |
| @ −30° F. | G | G | G/AG | G/AG/AP | G |
| @ 0° F. | G | G | G/AG | G/AG/AP | G |
| @ 75° F. | G/AG/AP/C | AG/AP/C | AG/AP/C | AG/AP/C | AP |
| @ 140° F. | AG/AP/C | AG/AP/C | AG/AP/C | AG/AP/C | AP |
| MODULUS ULTIMATE STRENGTH ELONGATION |  |  |  |  |  |
| @ 60° F. | 400 | 300 | 300 | 280 | 182 |
|  | 361 | 875 | 231 | 205 | 798 |
|  | 19% | 52% | 17% | 38% | 64% |
| @ −30° F. | 170 | 185 | 273 | 260 | 126 |
|  | 490 | 972 | 160 | 1325 | 598 |
|  | 30% | 69% | 28% | 76% | 65% |
| @ 0° F. | — | 163 | 218 | — | 81 |
|  | 857 | 524 | 400 | 1075 | 275 |
|  | 56% | 76% | 55% | 83% | 89% |
| @ 75° F. | 78 | 89 | 90 | 126 | 52 |
|  | 179 | 209 | 140 | 160 | 73 |
|  | 149% | 148% | 137% | 89% | 68% |
| @ 140° F. | 77 | 63 | 57 | 90 | 58 |
|  | 55 | 63 | 40 | 66 | 50 |
|  | 41% | 66% | 49 | 38% | 38% |

*G: glass breakage
AG: adhesion to glass
AP: adhesion to polycarbonate
C: cohesive As apparent from Table XI, the deletion of the silane catalyst and the use of an amino titanate catalyst resulted in similar properties. However, the humidity properties were greatly improved as apparent from Table XII, wherein Example 2 of Table XI was tested at 120° F., 95 percent relative humidity and various physical properties set forth after various time periods as set forth in Table XII.

TABLE XII

|  | MODULUS | ULTIMATE STRENGTH | PERCENT ELONGATION | FAILURE MODE |
|---|---|---|---|---|
| Initial (no exposure) | 27 | 66 | 93% | AG/AP/C |
| Second Sample | (100) | (192) | (93%) | " |
| 1 Day | 36 | 74 | 93% | AG/AP/C |
|  | (100) | (147) | (93%) | " |
| 2 Days | 33 | 61 | 141% | AG/AP/C |
|  | — | — | — | " |
| 5 Days | 25 | 50 | 152% | AG/AP/C |
|  | — | — | — |  |
| 6 Days | 28 | 51 | 151% | AG/AP/C |
|  | (90) | (131) | (119%) | " |
| 14 Days | 54 | 42 | 93% | AG/AP/C |
| 16 Days | (85) | (112) | (102%) | " |
| 19 Days | 34 | 48 | 124% | AG/AP/C |
| 21 Days | (87) | (105) | (89%) | AG/C/AP |
| 29 Days | 54 | 56 | 102% | AG/AP/C |
|  | — | — | — |  |
| 34 Days | 50 | 52 | 93% | AG/AP/C |

AG — Adhesion to Glass
AP — Adhesion to Polycarbonate
C — Cohesive

It is known that the above properties are improved over a composition containing a silane catalyst but no amino tritanate catalyst.

While in accordance with the patent statutes, one best mode and preferred embodiment of the invention has been provided, the invention is not to be limited thereto or thereby. Therefore, for an understanding of the scope of the invention, reference is to be had to the following claims.

What is claimed is:

1. A composition resistant to moisture permeation, comprising:
   a blend having,
   about 100 parts by weight of a mercaptain compound having at least two thio terminal groups,
   from about 20 parts to about 300 parts by epoxy resin, and
   from about 0.1 to about 4.0 parts by weight of an amino-titanate compound.

2. A composition resistant to moisture permeation according to claim 1, wherein said amino-titanate compound has the formula

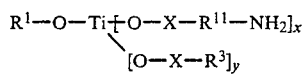

where x is 1,2 or 3, where y is 0,1 or 2, where $x+y=3$; where $R^1$ is alkyl having from 1 to 7 carbon atoms; where X is C=O, O=S=O, or nothing; where $R^{11}$ is an aromatic having 6 or 12 carbon atoms, an alkyl substituted aromatic having from 6 to 12 carbon atoms, an alkyl having from 1 to 8 carbon atoms, or $R^2$—N—H—$R^{21}$ where $R^2$ and $R^{21}$ can be the same or different and where $R^2$ or $R^{21}$ is an alkyl having from 1 to 10 carbon atoms; or where —$R^{11}$—$NH_2$ is tetra ethylene triamine; and where $R^3$ is an alkyl having from 1 to 25 carbon atoms or an alkyl substituted aromatic having from 10 to 25 carbon atoms.

3. A composition according to claim 2, wherein said mercaptan compound has the formula

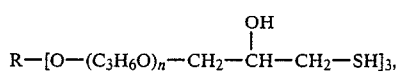

where R is an aliphatic group having from 1 to 18 carbon atoms, where n is 1 or 2, and where x is 2 or 3, wherein the amount of the epoxy is from about 25 to about 250 parts and wherein the amount of said titanate compound ranges from about 0.2 to about 2 parts by weight.

4. A composition according to claim 3 wherein said R in said mercaptan is a alkyl having from 1 to 11 carbon atoms and x is 3, wherein $R^1$ in said titanate is propyl, $R^{11}$ is said aromatic, or said $R^2$—NH—$R^{21}$ where R is 1 to 3 carbon atoms, or wherein $R^{11}$—$NH^2$ is tetra ethylene triamine, and wherein in said amino formulation $R^3$ is an alkyl having from 15 to 20 carbon atoms.

5. A composition according to claim 4 wherein said mercaptan formula R is propyl, and wherein the amount of epoxy is from about 25 parts to about 200 parts by weight and wherein the amount of said titanate compound is from about 0.3 to about 0.7 parts by weight.

6. A coposition according to claim 2 wherein a protonic acid is utilized in preparing said composition, the amount of said protonic acid ranging from about 0.01 to about 0.5 parts by weight per 100 parts of said mercaptan.

7. A composition according to claim 4, wherein a carbonxylic acid is utilized in preparing said composition, wherein the amount of said carboxylic acid is from about 0.01 to about 0.2 parts by weight per 100 parts by weight of said mercaptan and wherein said carboxylic acid is selected from the group consisting of lactic acid, butyric acid and acetic acid.

8. A laminate wherein the blend of claim 1 forms an outer layer on a transparent material or forms an interlayer between transparent materials.

9. A laminate according to claim 8, wherein said transparent material is selected from the group consisting of acrylic, polycarbonate, polyurethane, glass, polyvinyl butyral, and combinations thereof.

10. A laminate wherein the blend of claim 1 is transparent and forms an outer layer or an inner layer contiguous with at least one heat-resistant transparent material, said heat-resistant transparent material comprising about 100 parts by weight of an epoxy resin, from about 5 to about 30 parts by weight of a boroxine, and from about 1 to about 10 parts by weight of a phenyl substituted alkyl alcohol, said alkyl alcohol having from 1 to 20 carbon atoms, said boroxine having the formula

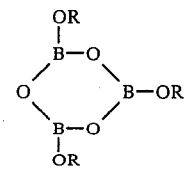

where R is a compound having from 1 to 18 carbon atoms.

11. A laminate acording to claim 10, including in said heat-resistant transparent layer containing said epoxy resin and said boroxine from about 1 to about 40 parts by weight of a phosphorus compound having the formula

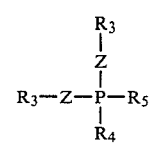

wherein $R_3$ is selected from the group consisting of hydrocarbon radicals having from 1 to 24 carbon atoms, halo-substituted organic radicals having from 1 to 24 carbon atoms, and multihalo-substituted organic radicals having from 1 to 24 carbon atoms, and wherein $R_3$ may be the same or different radicals; and $R_4$ is selected from the group consisting of all the radicals of $R_3$, oxygen, and radicals of the formula: O—$R_6$, where $R_6$ is selected from the group consisting of all the radicals of $R_3$, organo-phosphorus polymeric radicals, and organo-phosphorus esters; where $R_5$ is selected from the group consisting of hydrogen, hydroxyl, oxygen, sulfur, halogens or no radical at all; and where Z is selected from the group consisting of oxygen, sulfur, or no radical at all.

12. A laminate according to claim 11, wherein said phosphorus compound is selected from the group consisting of a phosphite, and a phosphate, wherein said phosphite is selected from the group consisting of diphenyl phosphite, trisnonylphenyl phosphite, triphenyl phosphite, diphenylisodecyl phosphite, diphenylisooctyl phosphite and phenyldiisodecyl phosphite, and wherein said phosphate compound is selected from the group consisting of tri(beta, beta' dichloroisopropyl) phosphate, tri(beta chloroethyl) phosphate, bis-chloroethyl phosphate ester, and a phosphate polymer of the formula

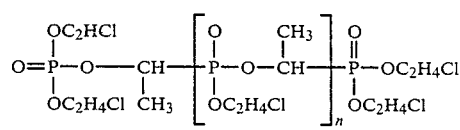

where n is a number from 1 to 20.

13. A laminate according to claim 12, wherein said R of said boroxine is an alkyl having 1 to 2 carbon atoms, wherein the amount of said boroxine ranges from about 8 to about 15 parts by weight, wherein the amount of said alcohol ranges from about 1 to about 5 parts.

14. A laminate wherein the blend of claim 4 forms an outer layer on a transparent material or forms an interlayer between transparent materials.

15. A laminate according to claim 14, wherein said transparent material is selected from the group consisting of acrylic, polycarbonate, polyurethane, glass, polyvinyl butyral, and combinations thereof.

16. A laminate wherein the blend of claim 15, is transparent and forms an outer layer or an inner layer contiguous with at least one heat-resistant transparent material, said heat-resistant transparent material having about 100 parts by weight of an epoxy resin, from about 5 to about 30 parts by weight of a boroxine, and from about 1 to about 10 parts by weight of a phenyl substituted alkyl alcohol, said alkyl alcohol having from 1 to 20 carbon atoms, said boroxine having the formula

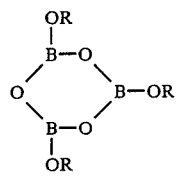

where R is a compound having from 1 to 18 carbon atoms.

17. A laminate according to claim 16, including from about 1 to about 40 parts by weight of a phosphorus compound having the formula

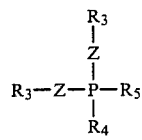

where $R_3$ is selected from the group consisting of hydrocarbon radicals having from 1 to 24 carbon atoms, halo-substituted organic radicals having from 1 to 24 carbon atoms, and multihalo-substituted organic radicals having from 1 to 24 carbon atoms; and wherein $R_3$ may be the same or different radicals; and $R_4$ is selected from the group consisting of all the radicals of $R_3$, oxygen, and radicals of the formula: —O—$R_6$, where $R_6$ is selected from the group consisting of all the radicals of $R_3$, organophosphorus polymeric radicals, and organo-phosphorus esters; where $R_5$ is selected from the group consisting of hydrogen, hydroxyl, oxygen, sulfur, halogens or no radical at all; and where Z is selected from the group consisting of oxygen, sulfur, or no radical at all.

18. A laminate according to claim 17, wherein said phosphorus compound is selected from the group consisting of a phosphite, and a phosphate, wherein said phosphite is selected from the group consisting of diphenyl phosphite, trisnonylphenyl phosphite, triphenyl phosphite, diphenylisodecyl phosphite, diphenylisooctyl phosphite and phenyldiisodecyl phosphite, and wherein said phosphate compound is selected from the group consisting of tri(beta, beta' dichloroisopropyl) phosphate, tri(beta chloroethyl) phosphate, bis-chloroethyl phosphate ester, and a phosphate polymer of the formula

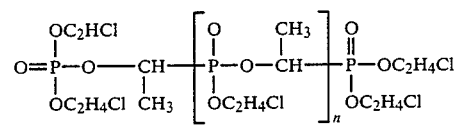

where n is a number from 1 to 20.

19. A laminate according to claim 18, wherein said R of said boroxine is an alkyl having 1 to 2 carbon atoms, wherein the amount of said boroxine ranges from about 8 to about 15 parts by weight, and wherein the amount of said alcohol ranges from about 1 to about 5 parts.

* * * * *